Sept. 2, 1969  P. F. M. PRILLINGER  3,464,714
ROCK EJECTOR FOR DUAL WHEEL VEHICLE
Filed Dec. 13, 1967  2 Sheets-Sheet 2
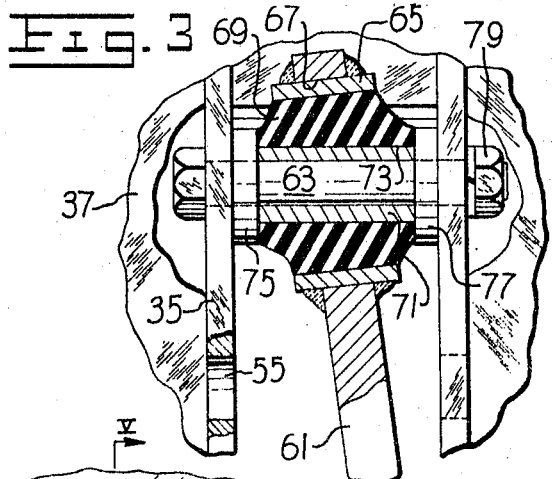
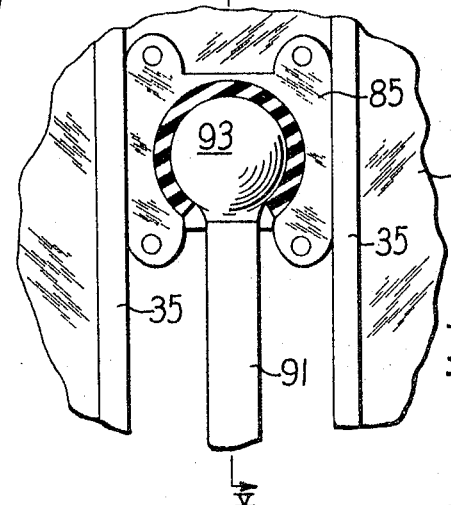
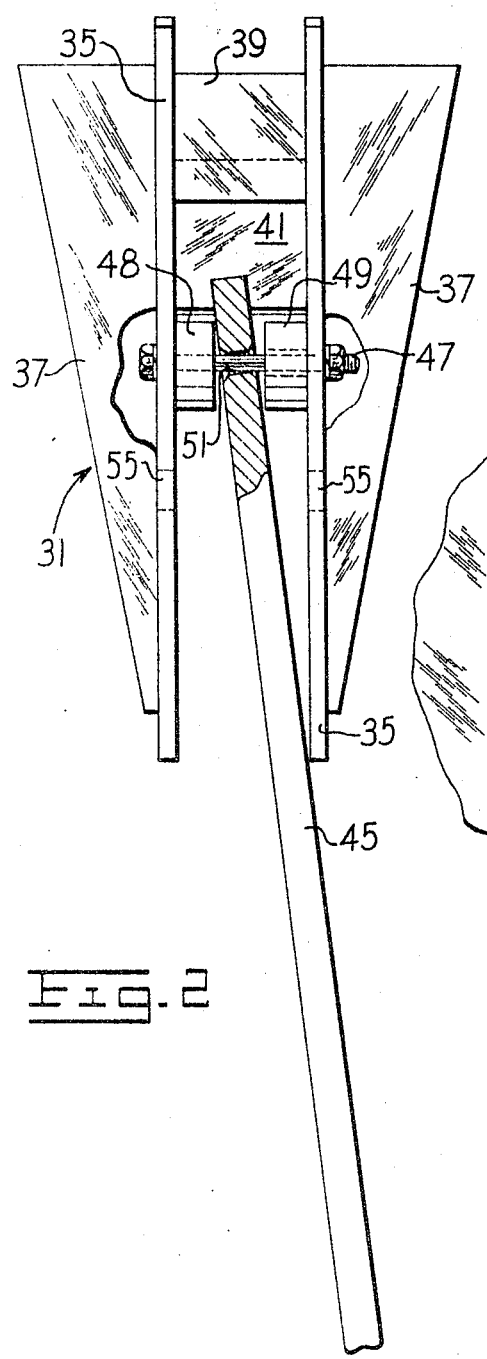
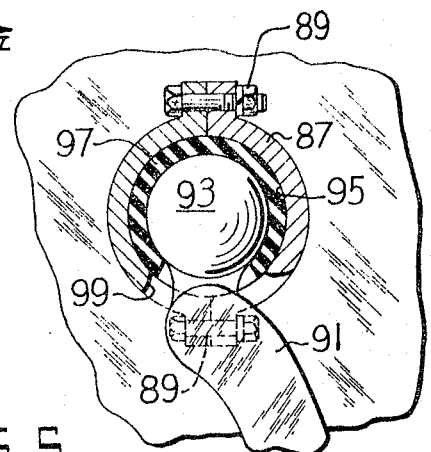
INVENTOR
PETER F. M. PRILLINGER
BY
*Fryer, Tjensvold, Feix, Phillips & Lempio*
ATTORNEYS United States Patent Office 3,464,714
Patented Sept. 2, 1969

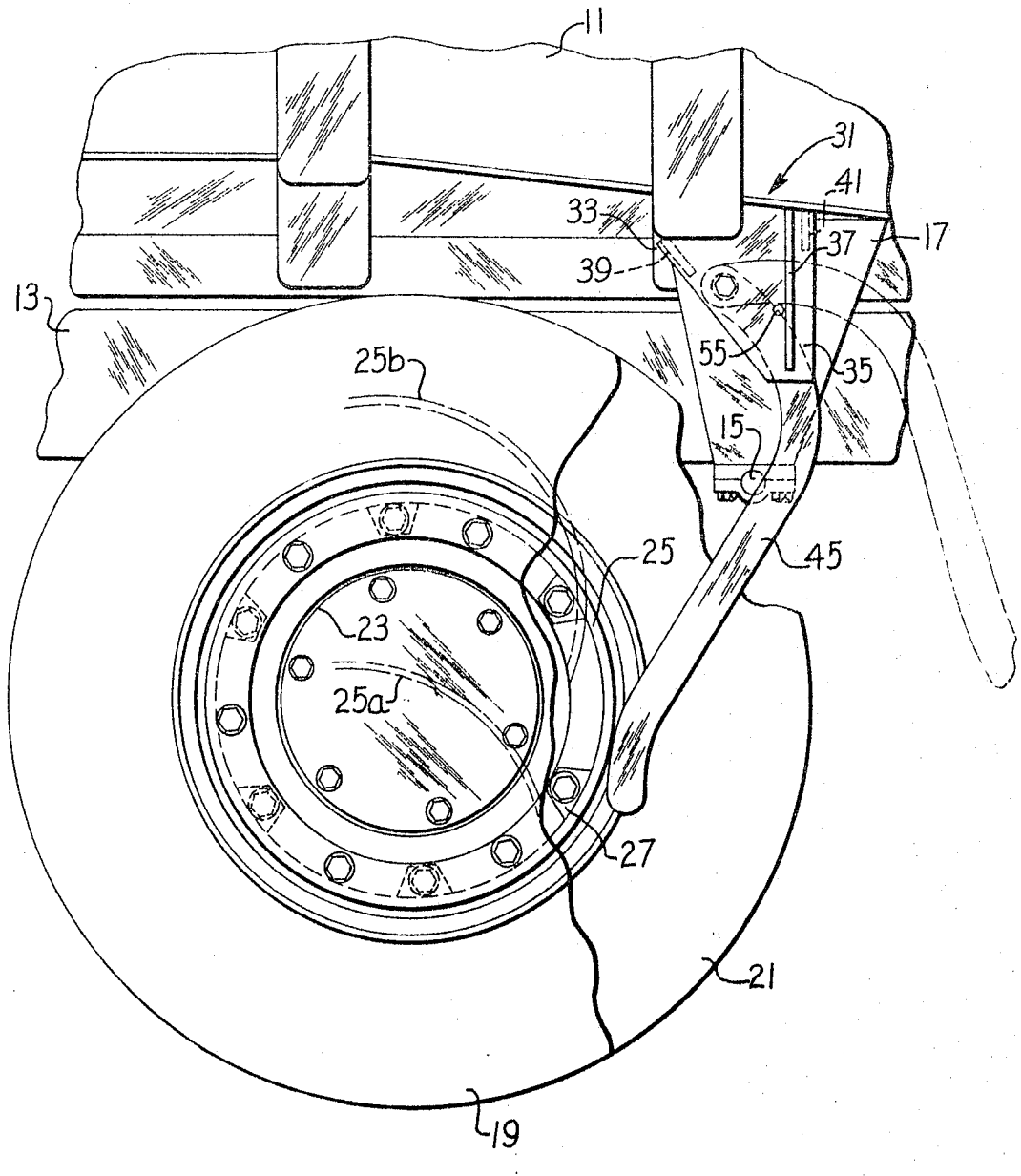

3,464,714
ROCK EJECTOR FOR DUAL WHEEL VEHICLE
Peter F. M. Prillinger, Decatur, Ill., assignor to Caterpillar Tractor Co., Peoria, Ill., a corporation of California
Filed Dec. 13, 1967, Ser. No. 690,199
Int. Cl. B60s 1/68, 1/62
U.S. Cl. 280—158                                    12 Claims

ABSTRACT OF THE DISCLOSURE

A rock ejector suspended from a bracket anchored beneath the body of a vehicle at a location between the wheels of a dual wheel assembly and behind the axis of the wheels, and of a curved shape, thereby allowing oscillation of the bar to match the vehicle suspension characteristics.

---

In dual wheel vehicles, especially those of the off-the-road variety, rocks and various articles of foreign matter often become lodged between the wheels. This may cause the wheel assembly to become unbalanced creating undue wear of the tires. Additionally the matter may be retained between the wheels for some time and then discharged at a rather high velocity, creating a great deal of damage to pedestrians and following vehicles.

Although rock ejectors, per se, are well known in the dual wheel vehicle field, most of the previous design have proven to be unsatisfactory in performance or else somewhat complicated, and therefore expensive, to design, manufacture and maintain.

It is, therefore, an object of the present invention to provide a rock ejector which features simplicity in design while embodying great efficiency in use.

It is also an object of the present invention to provide a rock ejector for use with dual wheels which is mounted in such a maner as to be able to pivot universally within predetermined limits necessary to avoid tire and wheel damage.

It is a further object of the present invention to provide a rock ejector which is mounted behind the axis of the dual wheels and is of a curved shape, thereby allowing the bar to oscillate in such a way as to match the suspension characteristics of the vehicle on which it is mounted.

It is also an object of the present invention to provide a rock ejector which is of one piece construction and is retained at its upper end in a loose fit manner so as to remove foreign matter from between the wheels without requiring articulated links or multiple pivots.

Other objects of the invention will become apparent to those skilled in the art when the following description is read in light of the drawings.

In the drawings:

FIG. 1 is a partial side view of a vehicle showing that portion of the vehicle pertinent to the illustration of the present invention;

FIG. 2 shows a rear view of the ejector bar and the mounting means therefor;

FIG. 3 shows a rear view of an alternate embodiment of the mounting means of the injector bar; and FIGS. 4 and 5 show a rear and side view of a second alternate embodiment of the mounting means for the ejector bar of the present invention.

Referring now to the drawings in greater detail, there is shown in FIG. 1 a dual wheel vehicle having a dump body 11 pivoted on a vehicle frame 13 about a pivot point 15 by means of a bracket 17. An outside wheel 19 and an inside wheel 21 are mounted on the vehicle in a well-known manner and are separated by a hub 23. A protection rim 25 extends about the hub and is attached to the inside wheel by means of a plurality of tabs 27 for a purpose later to be described. As the vehicle travels over terrain and the suspension system operated to maintain the vehicle in a level poistion, rim 25 may oscillate between a low position shown in phantom at 25a and a high position shown in phantom at 25b.

A bracket assembly 31 is mounted beneath the floor section of the dump body 11 behind a transverse reinforcing member 33 of the body.

The bracket assembly consists of two essentially parallel side plates 35 reinforced by two transversely extending gussets 37 outside of the plates and two gussets 39 and 41 between the plates. At a point slightly forward of the dump body pivot 15, an ejector bar 45 is mounted between the side plates on a large bolt 47 which passes through apertures in each of the side plates and through circular spacers 48 and 49 inside the side plates. The spacers may be welded or attached by other suitable means to the side plates. The ejector bar 45 hangs from the bolt 47 which extends through an aperture 51 in the bar. The dimensions of the apparatus are such that the ejector bar is allowed a loose fit on the bolt so as to permit lateral movement of the bar to an extent matching that of the oscillation of the wheel with which it is associated.

As shown in FIG. 1, the forward oscillation of the bar is limited by its contact with protection rim 25.

If it is desired to work on the wheels of the vehicles, the bar may be raised to the position shown in phantom in FIG. 1 and a pin inserted in the coaxial holes 55 of the side plates 35, thereby holding the bar in the elevated position. Further, by positioning the bar's pivot point relative to the dump pivot as previously described, the bar is automatically positioned so as to avoid problems when the dump body is raised.

As shown in FIG. 1, the curved shape of the bar causes it to hang freely between the dual wheels at a point only slightly behind the protection rim. This configuration permits the wheels to oscillate vertically, with the resultant lateral movement at the top of the tires, without causing the bar to bind between the tires. This is possible because, conversely to the straight bar configuration, where the bar would hang from the body at a point directly above the protection rim, the curved bar enters between the tires at a point closer to the normal axle center line, where the amount of lateral oscillation is much smaller.

The free end of the bar 45 may be shaped as shown so that in the event some force is exerted on it to cause it to swing rearwardly beyond the limits of the tires, such as when the dump body is raised, it can reenter between the tires without catching on the tire bead or tread and the bar will center itself between the tires as the wheel rotates. Since the bolt 47, acting as the pivot point of the bar 45, is very nearly vertically aligned with the dump body pivot 15, the bar expriences a minimum of vertical movement during the vehicle dump cycle. This prevents the free end of the bar from raising sufficiently to move ahead of the wheel housing as happens in some ejector configurations when the vehicle is moved while the dump body is elevated. This relationship of pivot points also prevents the bar from powering sufficiently to forcibly contact the ground.

Referring now to FIG. 3, there is shown an ejector bar 61 pivoted about a bolt 63. A tube or bushing 65 is welded or otherwise satisfactorily fastened within an aperture 67 of the ejector bar and a rubber bushing 69 is pressed into or bonded to the tube 65. A second tube or bushing 71 is bonded in an aperture 73 in the rubber bushing.

The metal sleeve 71 may be restricted against rotation on bolt 63 by being gripped between the spacers 75 and 77 when the nut 79 is tightened on bolt 63. The bar movement is then permitted by the distortion of the rubber bushing.

While permitting the necessary freedom of movement of the bar 61, the bonded rubber bushing eliminates unnecessary motion of the ejector bar between the tire walls, thereby reducing tire sidewall wear. Furthermore, it insures that the ejector bar remains in its effective position while the vehicle is negotiating an uphill grade.

Now referring to the configuration of the ejector bar mounting structure shown in FIGS. 4 and 5, there is illustrated one half of a four-bolt clamp 85 which is welded between the plates 35. A second half 87 of the four-bolt clamp mates with portions 85 and is fastened thereto by suitable means such as bolts 89. An ejector bar 91 having an integral ball or bull nose end 93 is fixed between the brackets by the captivation of the ball in an aperture 95 formed by the complementary bracket halves. A socket liner 97, of rubber or other suitable material, surrounds the ball end of the ejector with the exception of that portion leading to the bar 91. A slot 99 in the lower end of the fastened clamp halves permits transverse and longitudinal movement of the ejector bar within the elastic limits of the socket liner 97 which is compressed between the bracket and the ball head 93.

Thus, the applicant has invented and disclosed a new and novel dual wheel rock ejector bar together with three separate embodiments for mounting the bar on a vehicle body; this invention providing high efficiency in the removal of foreign matters between the vehicle wheels while being simple to maintain in essentially trouble-free operation.

I claim:

1. In a dual wheeled vehicle, an ejector bar having an upper end fastened to a pivot point on the body of the vehicle behind the axis of the dual wheels, the bar extending downwardly and ending in a lower end normally maintained in a position adjacent to but rearward of the axle housing of the dual wheels, an upper portion of the bar extending rearwardly from the pivot point and a lower portion of the bar extending forwardly from the upper portion in such a manner that the majority of the effective length of an ejector surface on the bar is maintained between the pivot point of the dual wheel axis.

2. The apparatus of claim 1 and means cooperating with said pivot point for maintaining said ejector bar in a position wherein the said majority of the effective length of said ejector surface is maintained in a position toward the rear of said vehicle and clear of said dual wheels.

3. The apparatus of claim 1 including a protection rim mounted between said dual wheels for maintaining said ejector bar free from contact with the vehicle wheel mounting bolts.

4. In the dual wheeled vehicle of claim 1, means on said ejector bar allowing universal movement of said ejector bar about said pivot point.

5. The apparatus of claim 4 including means cooperating with said pivot point to limit the universal movement of said ejector bar to a prescribed amount whereby the lower end of said ejector bar cannot touch the sidewalls of said dual wheels.

6. The apparatus of claim 4 wherein said ejector bar has an aperture at the upper end thereof, and a pin at said pivot point extends through said aperture, said aperture being substantially larger in diameter than said pin.

7. The apparatus of claim 6 wherein an elastic member is situated in said aperture and said pin extends through said elastic member, and means cooperates with said pivot pin and said elastic member to bias said ejector bar to a predetermined position relative to said dual wheels.

8. The apparatus of claim 4 wherein said ejector bar has a ball at the upper end thereof and said pivot point includes a socket for holding said ball.

9. The apparatus of claim 8 wherein an elastomeric member is situated in said socket and about the periphery of said ball, and means cooperate with said socket and said elastic member to bias said ejector bar to a predetermined position relative to said dual wheels.

10. The apparatus of claim 1 wherein said bar may be pivoted entirely clear of said dual wheels and means on the lower end of said bar for keeping said lower end from catching on the wheel tread or casing as the bar returns to the position between the dual wheels.

11. The apparatus of claim 1 and means on said body for selectively retaining said bar in a position clear of said dual wheels.

12. In a dual wheeled vehicle, an ejector bar extending downwardly to a position between the dual wheels of said vehicle from a mounting means on the body of said vehicle, and a holding means on said body for positioning the bar, so that it is maintained in a position clear of the dual wheels of said vehicle.

References Cited
UNITED STATES PATENTS

| | | | |
|---|---|---|---|
| 2,617,663 | 11/1952 | Carlton | 280—158 |
| 2,738,986 | 3/1956 | Pelton | 280—158 |
| 2,839,313 | 6/1958 | Walko | 280—158 |

LEO FRIAGLIA, Primary Examiner

ROBERT R. SONG, Assistant Examiner